(12) United States Patent
Ku (10) Patent No.: US 9,361,932 B2
(45) Date of Patent: Jun. 7, 2016

(54) FLUID DYNAMIC BEARING GROOVE CONFIGURATION

(71) Applicant: HGST Netherlands B.V., Amsterdam (NL)

(72) Inventor: Chiaoping Ku, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/515,318

(22) Filed: Oct. 15, 2014

(65) Prior Publication Data

US 2016/0111124 A1   Apr. 21, 2016

(51) Int. Cl.
*G11B 19/20* (2006.01)
*F16C 17/02* (2006.01)
*F16C 17/10* (2006.01)

(52) U.S. Cl.
CPC .......... *G11B 19/2036* (2013.01); *F16C 17/026* (2013.01); *F16C 17/107* (2013.01)

(58) Field of Classification Search
None
See application file for complete search history.

(56) References Cited

U.S. PATENT DOCUMENTS

| | | | | | |
|---|---|---|---|---|---|
| 4,875,263 | A | * | 10/1989 | Furumura | F16C 33/107 384/297 |
| 4,883,367 | A | * | 11/1989 | Maruyama | F16C 33/107 384/112 |
| 5,018,881 | A | * | 5/1991 | Asada | F16C 33/107 384/113 |
| 5,096,309 | A | * | 3/1992 | Nakasugi | F16C 33/107 384/113 |
| 5,273,368 | A | * | 12/1993 | Asada | F16C 33/107 384/113 |
| 5,466,070 | A | * | 11/1995 | Nakasugi | F16C 33/107 384/112 |
| 6,456,458 | B1 | * | 9/2002 | Ichiyama | F16C 33/107 360/99.08 |
| 6,664,687 | B2 | | 12/2003 | Ichiyama | |
| 6,815,855 | B2 | * | 11/2004 | Yashiro | F16C 33/107 310/90 |
| 7,372,663 | B2 | | 5/2008 | Leblanc et al. | |
| 7,401,979 | B2 | | 7/2008 | Ando et al. | |
| 7,465,098 | B2 | | 12/2008 | Hendriks et al. | |
| 7,821,167 | B2 | | 10/2010 | Hendriks | |
| 8,181,348 | B2 | | 5/2012 | Herndon et al. | |
| 8,248,725 | B2 | | 8/2012 | Hendriks et al. | |
| 8,339,731 | B2 | | 12/2012 | Leuthold et al. | |
| 2011/0051591 | A1 | * | 3/2011 | Yang | F16C 33/107 310/90 |
| 2012/0063030 | A1 | * | 3/2012 | Yamada | F16C 33/107 360/99.08 |
| 2013/0009499 | A1 | | 1/2013 | Lee et al. | |

OTHER PUBLICATIONS

Thitima Jintanawan; Vibration of hard disk drive spindle systems with distributed journal bearing forces; Microsystem Technologies; Feb. 2006; vol. 12 Issue 3; Springer-Verlag. Abstract Only.

* cited by examiner

*Primary Examiner* — Craig A. Renner
(74) *Attorney, Agent, or Firm* — John D. Henkhaus (57) ABSTRACT

A fluid dynamic bearing (FDB) includes a groove configuration that includes a pressure-generating groove pattern, and additionally includes a circumferential groove adjacent to the pressure-generating groove pattern and a pumping groove pattern adjacent to the circumferential groove. The circumferential groove may be deeper than the associated pumping and pressure-generating groove patterns and may extend for 360 degrees, and the pumping groove may be positioned at or near the entry to the bearing journal area to help maintain fluid flow direction and minimum pressure. Such an FDB groove configuration is likely to provide improved damping characteristics while maintaining relative stiffness, thereby improving vibration response characteristics.

18 Claims, 5 Drawing Sheets

ON A SHAFT OR A SLEEVE OF A FLUID DYNAMIC JOURNAL BEARING, FORM A PUMPING GROOVE PATTERN POSITIONED AT OR NEAR AN ENTRY REGION OF THE JOURNAL BEARING
502

FORM A CIRCUMFERENTIAL GROOVE ADJACENT THE PUMPING GROOVE PATTERN AND EXTENDING FOR 360 DEGREES
504

FORM A HERRINGBONE GROOVE PATTERN ADJACENT THE CIRCUMFERENTIAL GROOVE
506

FIG. 5

FLUID DYNAMIC BEARING GROOVE CONFIGURATION

FIELD OF EMBODIMENTS

Embodiments of the invention may relate generally to fluid dynamic bearings and more particularly to a fluid dynamic bearing groove configuration.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the head induces a magnetic field across the gap between the head and the magnetic disk, which in turn magnetizes a small area on the recording medium.

The spindle system for rotating the one or more disk typically includes a motor assembly (sometimes referred to as a spindle motor assembly), which includes a bearing assembly. One approach to a bearing assembly is use of a fluid dynamic bearing (FDB), which generally may have a longer life than a ball bearing and is more suitable for relatively high vibration environments and/or low noise requirements. As with many if not all dynamic systems, the motor assembly and in turn the associated bearing assembly are subject to vibration forces and, therefore, have unique vibration force responses. In the context of HDDs, poor vibration response characteristics can cause, for example, a recording disk to bend and/or a disk stack to tilt, and the like. These effects in turn can cause track misregistration (TMR), such as non-repeatable runout (NRRO). Furthermore, customers mandate meeting stringent performance requirements, which may include noise requirements as well as vibration requirements, which generally relate to an HDD's operational resistance to or operational tolerance of vibration forces. Thus, improvements to vibration force responses are a common challenge facing engineers and designers of dynamic systems, systems affected by external vibrations, and the like.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a fluid dynamic bearing (FDB), a hard disk drive comprising such an FDB, and associated methods for damping a FDB journal bearing. An FDB according to embodiments includes a groove configuration that includes a pressure-generating groove pattern, and additionally includes a circumferential groove adjacent to the pressure-generating groove pattern and a pumping groove pattern adjacent to the circumferential groove. The groove configuration may be implemented on the bearing shaft or the bearing sleeve, regardless of whether each respective component rotates or is static. Such an FDB groove configuration for a journal bearing, for example, is likely to provide improved damping characteristics while maintaining relative stiffness, thereby improving vibration response.

According to various embodiments, the circumferential groove extends for 360 degrees, and the pumping groove is positioned at or near the entry to a bearing journal area, i.e., the groove configuration area. Further, other embodiments involve the respective depths of each of the grooves that make up the groove configuration, where the circumferential groove is deeper than the associated pumping and pressure-generating groove patterns.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Improvements to a fluid dynamic bearing (FDB) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used for, but are not limited to, a spindle motor assembly for a hard-disk drive (HDD) storage device. Thus, in accordance with an embodiment, a plan view illustrating an HDD 100 is shown in FIG. 1 to illustrate an exemplary operating environment.

Figure 1:
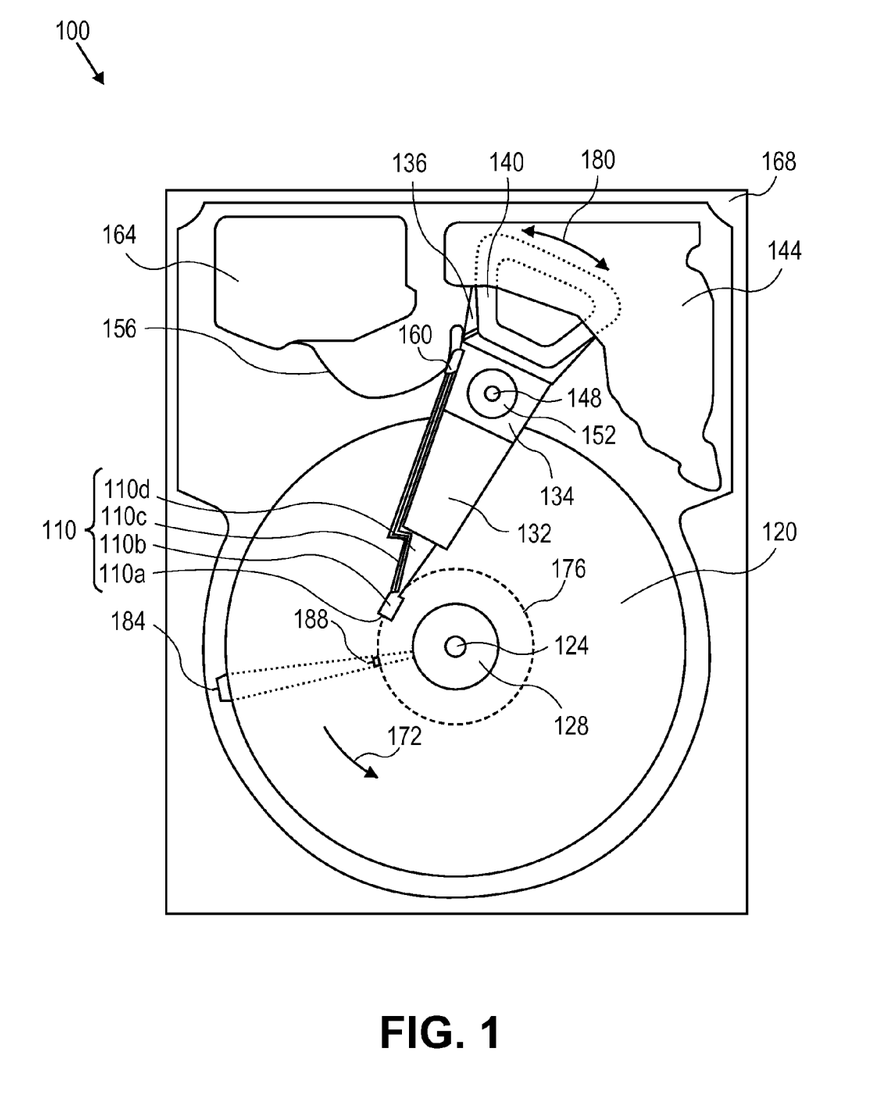
FIG. 1 is a plan view illustrating a hard disk drive, according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

The tied-shaft fluid dynamic bearing (FDB) design is often used for heavy loaded hard disk drives (HDD), to improve structure rigidity. Two types of tied-shaft FDB designs are popular, one has a conical shape and the other one is a spool type. For a conical shape FDB, both top and bottom cone surfaces have larger diameters that provide higher structural stiffness, FDB stiffness and run current. The higher structural stiffness may reduce the vibration response, especially in the frequency range above 1500 Hz. However, the higher run current may limit implementations of the conical FDB design in high rotating speed (>15000 rpm), relatively high disk count HDDs.

By contrast, a spool type tied-shaft FDB designs consumes significantly less run current and is a better candidate for high rotating speed HDD applications. However, the structural stiffness of a spool type tied-shaft design is lower than for a conical FDB design and therefore can expose it to higher vibration responses, especially in the high frequency range such as in an FDB radial mode (e.g., around 3 kHz). Besides increasing the HDD structural stiffness, one approach to improving FDB and HDD disk pack vibration response at the FDB radial mode is to reduce FDB damping coefficients. However, reducing FDB damping is often at the expense of decreasing FDB stiffness. Therein lies at least one of the challenges associated with improving the vibration response of an HDD, that is, lowering the damping while maintaining the stiffness.

A typical spool type tied-shaft FDB design comprises two journal bearings, and the herringbone groove design is the most common design which provides high bearing stiffness and stability. An FDB's stiffness and damping coefficients are determined by (1) bearing geometry, such as diameter, bearing radial gap, bearing length; (2) bearing groove pattern, such as groove angle, groove depth, groove width; and (3) operating speed, temperature and lubricant properties. One straightforward approach to reducing FDB damping is to increase bearing radial gap, but at the same time the FDB stiffness is decreased proportionally. Other approaches to reducing FDB damping may include optimizing groove patterns, however, the FDB stiffness should still be kept at the same level.

Furthermore, a typical pressure-generating groove pattern is designed to suck in fluid from both directions. However, a groove pattern such as that may experience difficulty with supplying enough fluid, and supplying it rapidly enough, to the bearing journal region to support the shaft as may be desired. For example, a typical pressure-generating groove pattern may experience low pressure at each end (i.e., at each "entry region"), in fact sometimes sub-ambient pressure, which is detrimental to the bearing performance. Therefore, raising the pressure at the entry region is desirable, to reduce the damping characteristics of the FDB, while maintaining the stiffness.

Fluid Dynamic Bearing

Figure 2:
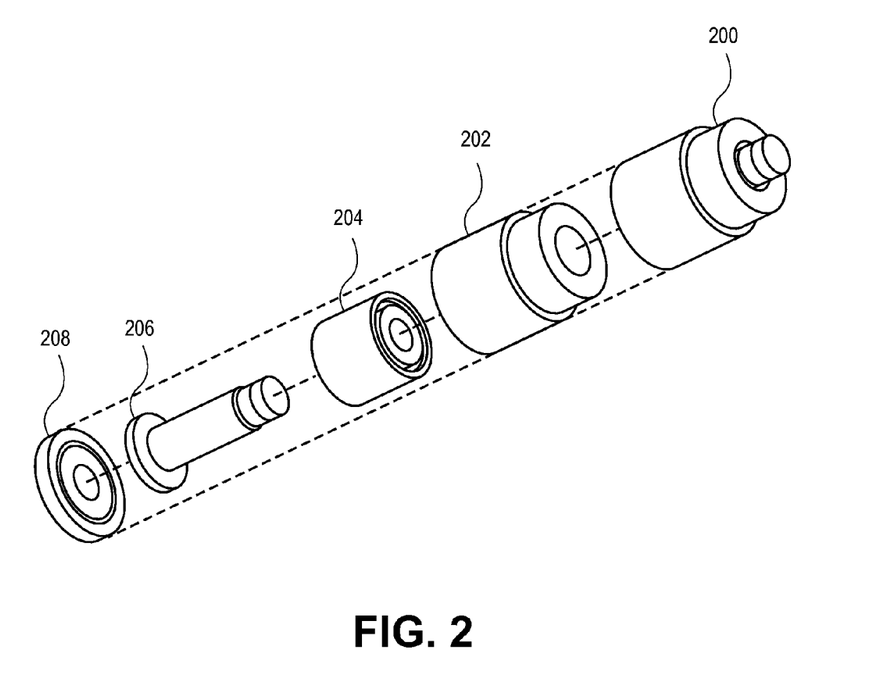
FIG. 2 is an exploded perspective view illustrating a fluid dynamic bearing, according to an embodiment.

FIG. 2 is an exploded perspective view illustrating a fluid dynamic bearing, according to an embodiment. A common configuration for a fluid dynamic bearing (FDB) such as FDB 200 comprises a housing 202 encasing a sleeve 204, in which a shaft 206 is disposed. A fluid is sealed within a gap between the shaft 206 and the sleeve 204. The fluid is pressurized by the rotational movement of the shaft or the sleeve, whichever the case may be, at the journal area, i.e., the part of the shaft 206 that rests on the bearing fluid. It is common to use groove patterns in the gap to assist with pressurizing and directing the bearing fluid, as is explained in more detail herein. Further, a fluid dynamic bearing may also comprise a thrust bearing 208 at the bottom and in contact with the shaft 206, in which case the FDB 200 provides both predominately radial bearing of the shaft applied at the journal area(s) largely by way of the shaft 206 and the sleeve 204 and predominately axial (or thrust) bearing of the shaft largely by way of the thrust bearing 208 component of FDB 200.

Figure 3:
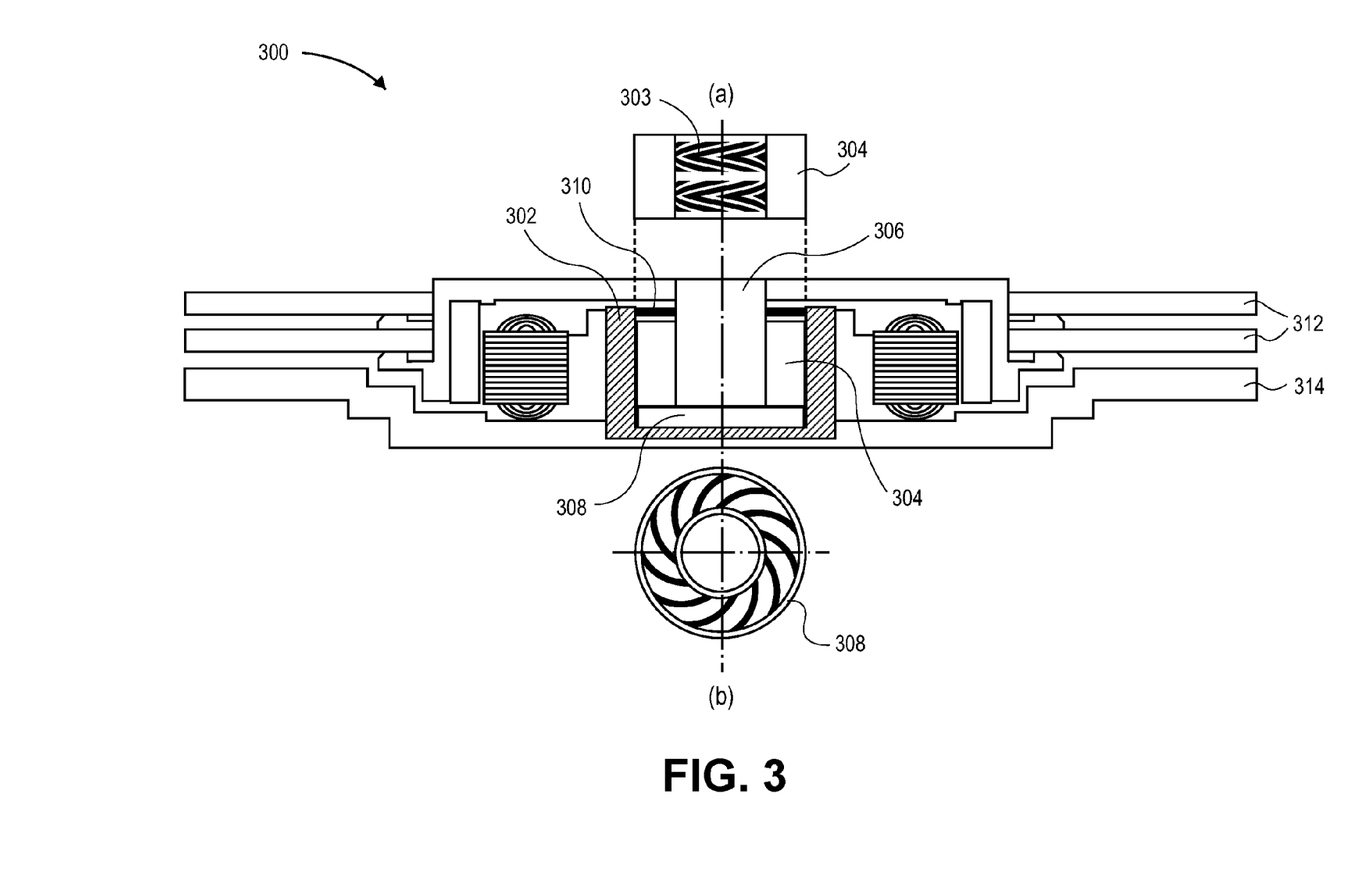
FIG. 3 is a cross sectional view illustrating a spindle motor assembly, according to an embodiment.

FIG. 3 is a cross sectional view illustrating a spindle motor assembly, according to an embodiment. In particular, the spindle motor assembly 300 illustrated in FIG. 3 is depicted in the context of a hard disk drive (HDD), comprising one or more recording disk 312 (or, generally, "recording media") rotatably coupled to a spindle motor assembly, which is typically attached to an HDD base 314. An FDB is depicted in the center of the spindle motor assembly 300, and provides the rotation axis for the one or more recording disk 312.

Similar as with the FDB 200 of FIG. 2, the FDB depicted in FIG. 3 comprises fluid and a shaft 306 disposed within a sleeve 304, housed in a housing 302 and sealed by a seal 310. FIG. 3(a) illustrates a pressure-generating groove pattern 303 formed on the inner surface of the sleeve 304, with the groove pattern 303 depicted commonly referred to as a herringbone groove pattern. The groove pattern 303 functions to generate fluid pressure and gather the fluid (e.g., in the case of a herringbone groove pattern, at the sharp end of the two wings of the herringbone pattern), thereby providing a focused or localized bearing force. The shape of the pressure-generating groove pattern for an FDB may vary from implementation to implementation and, therefore, the herringbone groove pattern is depicted here for purposes of example and based on its fairly common usage.

Also shown in FIG. 3 is a thrust bearing 308, having a spiral groove pattern as depicted in FIG. 3(b). Spiral groove thrust bearings are used to reduce friction and wear without the use of pressurized lubricants. Largely due to the groove pattern of a thrust bearing, the bearing rotation generates the pressure needed to separate the bearing surfaces. Use of a thrust bearing may vary from implementation to implementation and, therefore, embodiments do not necessarily require a thrust bearing, unless specifically recited in a claim. As with the FDB, the shape of the pressure-generating groove pattern for a thrust bearing may vary from implementation to implementation and, therefore, the spiral groove pattern is depicted here for purposes of example and based on its fairly common usage.

Fluid Dynamic Bearing Groove Configuration

Figure 4A:
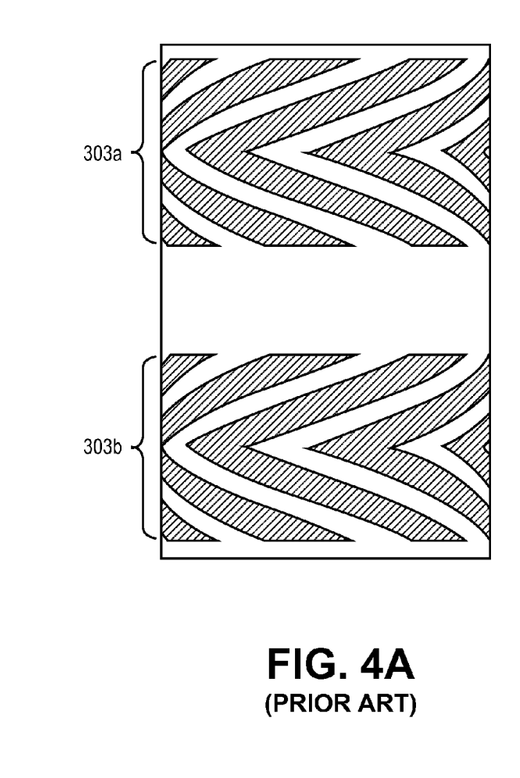
FIG. 4A is a diagram illustrating a pressure-generating groove pattern associated with a fluid dynamic bearing.

FIG. 4A is a diagram illustrating a pressure-generating groove pattern associated with a fluid dynamic bearing (FDB). Each pressure-generating groove pattern 303a and pressure-generating groove pattern 303b functions to generate fluid pressure and gather the fluid, thereby providing a focused or localized bearing force. The shape of the pressure-generating groove patterns 303a, 303b resemble what is commonly referred to as a herringbone groove pattern, a common groove pattern known in the HDD field.

Figure 4B:
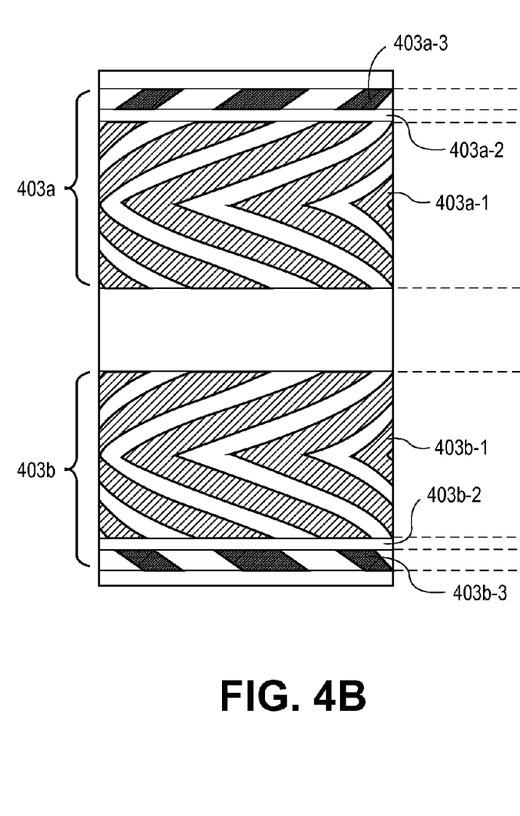
FIG. 4B is a diagram illustrating a groove configuration associated with a fluid dynamic bearing, according to an embodiment.

FIG. 4B is a diagram illustrating a groove configuration associated with a fluid dynamic bearing (FDB), according to an embodiment. FIG. 4B depicts two groove configurations, groove configuration 403a and groove configuration 403b. For example, one groove configuration 403a may be used as part of a fluid dynamic journal bearing (e.g., an upper bearing), and the other groove configuration 403b may be used as part of another fluid dynamic journal bearing (e.g., a lower bearing). However, the number of FDBs used may vary from implementation to implementation and, as such, an associated spindle motor assembly or an associated hard disk drive may be configured with only a single FDB, for example.

Each pressure-generating groove pattern 403a and pressure-generating groove pattern 403b functions to generate fluid pressure and gather the fluid, thereby providing a focused or localized bearing force. According to an embodiment, groove configuration 403a comprises a pressure-generating groove pattern 403a-1, a circumferential groove 403a-2 adjacent to the pressure-generating groove pattern 403a-1, and a pumping groove pattern 403a-3 adjacent to the circumferential groove 403a-2. The shape of the pressure-generating groove patterns 403a-1 may vary from implementation to implementation. According to an embodiment, the pressure-generating groove pattern 403a-1 resembles what is commonly referred to as a herringbone groove pattern. As discussed, a herringbone groove pattern functions to pump oil or other fluid to the apex of the groove pattern, thereby generating a pressure peak at this localized area, which in turn increases the load capacity of the corresponding FDB.

According to an embodiment, the circumferential groove 403a-2 extends for 360 degrees. For example, with a groove configuration 403a configured on a FDB sleeve, the circumferential groove 403a-2 would extend for 360 degrees, or the entire way around the circumference of the sleeve. Similarly, with a groove configuration 403a configured on a FDB shaft, the circumferential groove 403a-2 would extend for 360 degrees, or the entire way around the circumference of the shaft. Use of a groove such as circumferential groove 403a-2 in a FDB has shown to reduce the damping of the FDB on the order of about 25%, for a non-limiting example, when compared with a similar FDB design that does not include such a groove. Further, use of a groove such as circumferential groove 403a-2 in a FDB has shown to reduce the damping of the FDB while not reducing the stiffness of the FDB, i.e., while maintaining the stiffness of the FDB, again, when compared with a similar FDB design that does not include such a groove. At least part of the reason for the foregoing effect of the circumferential groove 403a-2 is based on the relative depth of the different components of the groove configuration 403a, which is described in more detail in reference to FIG. 4C.

According to an embodiment, the pumping groove pattern 403a-3 is positioned at or near the entry region of the FDB, i.e., at the entry to the groove region, as shown. According to an embodiment, the pumping groove pattern 403a-3 resembles an extension of the pressure-generating groove pattern 403a-1. For example, when the pressure-generating groove pattern 403a-1 is implemented as a herringbone groove pattern, then the pumping groove pattern 403a-3 resembles an extension of that herringbone groove pattern, but for the break in the pattern corresponding to the circumferential groove 403a-2, as depicted in FIG. 4B.

According to an embodiment, the pumping groove pattern 403a-3 is configured to maintain the flow of the fluid (e.g., oil or other lubricant) encased within the FDB, in a particular direction and at or above a particular minimum pressure, the particulars of both of which may vary from implementation to implementation. For example, the pumping groove pattern 403a-3 may assist with maintaining the flow of the fluid across the circumferential groove 403a-2 and into the pressure-generating groove pattern 403a-1 region and ultimately to the desired region of the pressure-generating groove pattern 403a-1 (e.g., the apex of a herringbone pattern), as well as assist with maintaining the fluid pressure high enough to overcome the pressure drop or stagnation that could otherwise correspond to an effect of the circumferential groove 403a-2.

With these additional grooves at the entry region, the FDB stiffness can be kept about the same while the FDB damping is reduced and, therefore, the vibration force responses are improved. These additional grooves at the entry region may also improve the FDB reliability. During start-stop operations, the rotating parts have to touch down with the stationary parts, thus the two entry regions of the upper and lower journal bearing are exposed to start-stop touch down. After thousands of start-stop cycles, it is common for the two entry regions to show wear, e.g., the groove pattern may be worn out. However, the additional grooves at the entry region can improve the reliability, e.g., of the pressure-generating groove pattern, over the repetitive cycles of FDB start-stop operations.

Similarly to groove configuration 403a, according to an embodiment an FDB may have another groove configuration 403b, simply shown in FIG. 4B as a mirror configuration of groove configuration 403a. Thus, groove configuration 403b comprises a pressure-generating groove pattern 403b-1, a circumferential groove 403b-2, and a pumping groove pattern 403b-3. The foregoing description corresponding to groove configuration 403a is further applicable to groove configuration 403b and, therefore, for purposes of brevity and clarity is not repeated here. Thus, refer to the description associated with the pressure-generating groove pattern 403a-1, the circumferential groove 403a-2, and the pumping groove pattern 403a-3 for information about the similar pressure-generating groove pattern 403b-1, the circumferential groove 403b-2, and the pumping groove pattern 403b-3. However, note that groove configuration 403a and groove configuration 403b need not be the same or similarly configured, and that the number of FDB's may vary from implementation to implementation.

Figure 4C:
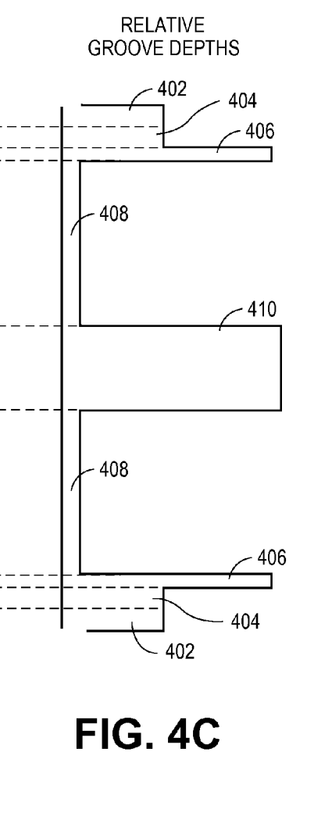
FIG. 4C is a diagram illustrating the relative depths corresponding to the groove configuration of FIG. 4B, according to an embodiment.

FIG. 4C is a diagram illustrating the relative depths corresponding to the groove configuration of FIG. 4B, according to an embodiment. In the center region, between the groove configurations 403a, 403b corresponding to upper and lower FDBs, depth 410 represents the journal bearing radial gap between the FDB shaft and sleeve, e.g., the gap between shaft 206 and sleeve 204 (FIG. 2), in the un-grooved region. This is a reservoir region and, therefore, has a relatively significant gap illustrated by depth 410.

Pressure-generating groove depth 408 is depicted as being significantly shallower than the reservoir radial gap depicted by depth 410, illustrating that the pressure generating groove patterns 403a-1, 403b-1 include grooves recessed (for a non-limiting example, machined) a certain distance within the sleeve 204 or shaft 206 (FIG. 2) material. For a non-limiting example, the journal bearing reservoir recess depth 410 may be around 20-50 microns whereas the pressure-generating groove depth 408 may be around 2-9 microns. At this point note that FIG. 4C is not intended to be drawn to precise scale, rather FIG. 4C is to provide a general visualization and conceptualization of relative depths associated with the groove configurations 403a, 403b described herein.

With further reference to FIG. 4C, according to an embodiment circumferential groove depth 406 is depicted as being deeper than the pressure-generating groove depth 408, thereby illustrating that the circumferential grooves 403a-2, 403b-2 are relatively and substantially deep grooves recessed (for a non-limiting example, machined) a certain distance deeper within the sleeve 204 or shaft 206 (FIG. 2) material than the respective pressure-generating groove patterns 403a-1, 403b-1, as represented by pressure-generating groove depth 408. Further, note also that according to an embodiment circumferential groove depth 406 is depicted as being deeper than a pumping groove depth 404, thereby illustrating that the circumferential grooves 403a-2, 403b-2 are relatively and substantially deep grooves recessed a certain distance deeper within the sleeve 204 or shaft 206 (FIG. 2) material than the respective pressure-generating groove patterns 403a-1, 403b-1 and the respective pumping groove patterns 403a-3, 403b-3. The actual value of depth 406 may vary from implementation to implementation, but it is at least in part the configuration of the circumferential groove depth 406 that affects the damping or damping capability of the corresponding FDB.

Still in reference to FIG. 4C, according to an embodiment the pumping groove depth 404 is depicted as being deeper than the pressure-generating groove depth 408, thereby illustrating that the pumping groove patterns 403a-3, 403b-3 are relatively deeper grooves recessed (for a non-limiting example, machined) a certain distance deeper within the sleeve 204 or shaft 206 (FIG. 2) material than the respective pressure-generating groove patterns 403a-1, 403b-1, but not as deep as the respective circumferential groove patterns 403a-2, 403b-2 as represented by circumferential groove depth 406. The actual value of depth 404 may vary from implementation to implementation, but it is at least in part the configuration of the pumping groove depth 404, as well as its form and shape, that affects the corresponding FDB fluid flow direction and pressure to effectively balance, at least in part, some of the undesirable effect(s) of the circumferential groove 403a-2, 403b-2. Preferably, and by way of a non-limiting example, the effective "strength" of the pumping groove pattern (e.g., 403a-3) is less than that of the pressure-generating groove pattern (e.g., 403a-1), thereby generating a lower flow rate and pressure than does the pressure-generating groove pattern, based at least in part on the relative depths of the pumping groove depth 404 and the pressure-generating groove depth 408.

Finally, according to an embodiment an entry region depth 402 is depicted as being deeper than the pressure-generating groove depth 408, thereby illustrating that the entry region is relatively deeper within the sleeve 204 or shaft 206 (FIG. 2) material than the respective pressure-generating groove patterns 403a-1, 403b-1, but not as deep as the respective circumferential groove patterns 403a-2, 403b-2. The actual value of depth 404 may vary from implementation to implementation and is depicted as about the same depth as the pumping groove depth 404, for exemplary purposes.

According to embodiments, the groove configuration 403a and/or groove configuration 403b may be formed on an FDB sleeve (e.g., sleeve 204 of FIG. 2 and sleeve 304 of FIG. 3), whether the sleeve is a rotating part (a rotor) or a static part (a stator). According to embodiments, the groove configuration 403a and/or groove configuration 403b may be formed on an FDB shaft (e.g., shaft 206 of FIG. 2 and shaft 306 of FIG. 3), whether the shaft is a rotating part (a rotor) or a static part (a stator), such as in a HDD tied-shaft FDB spindle motor design.

Method for Damping a Fluid Dynamic Bearing Journal Bearing

Figure 5:
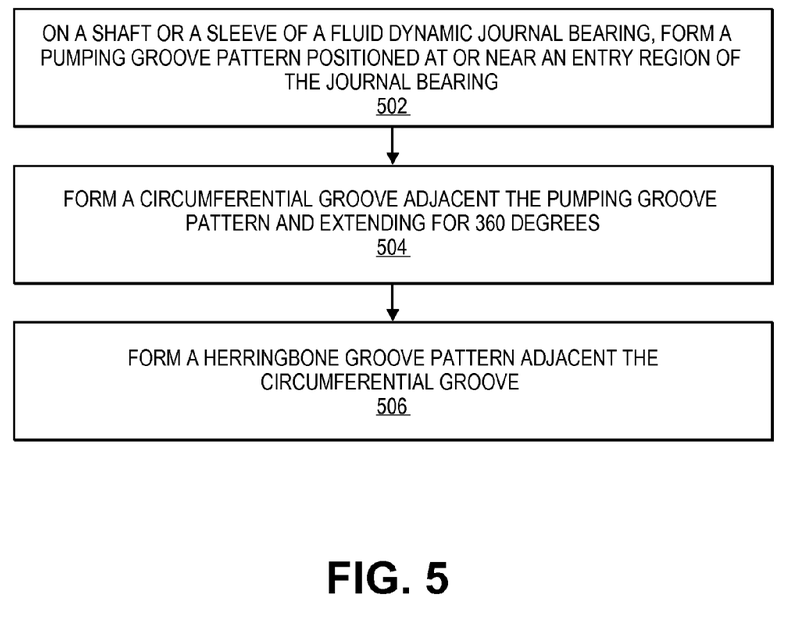
FIG. 5 is a flow diagram illustrating a method for damping a fluid dynamic journal bearing, according to an embodiment.

FIG. 5 is a flow diagram illustrating a method for damping a fluid dynamic journal bearing, according to an embodiment.

At block 502, on a shaft or a sleeve of a fluid dynamic journal bearing, form a pumping groove pattern positioned at or near the entry region of the journal bearing. For example, pumping groove pattern 403a-3 (FIG. 4B) is machined, or otherwise formed, on an FDB sleeve (e.g., sleeve 204 of FIG. 2 or sleeve 304 of FIG. 3) or on an FDB shaft (e.g., shaft 206 of FIG. 2 or shaft 306 of FIG. 3), at or near the entry region of the journal bearing, e.g., near where the groove pattern 403a (FIG. 4B) begins for the upper journal bearing. As discussed, the journal bearing region is the region at which bearing forces are applied to the shaft, which is designed to be the groove configuration region, generally, and an area corresponding with the pressure-generating groove pattern (e.g., 403a-1 of FIG. 4B), more specifically. As such, the pumping groove pattern is preferably formed near the pressure-generating groove pattern. As discussed, the pumping groove pattern operates by affecting the corresponding FDB fluid flow direction and pressure to effectively balance, at least in part, some of the undesirable effect(s) of the circumferential groove.

At block 504, a circumferential groove is formed adjacent to the pumping groove pattern and extending 360 degrees. For example, circumferential groove 403a-2 (FIG. 4B) is machined or otherwise formed on the FDB sleeve or on the FDB shaft, adjacent to the pumping groove pattern 403a-3 (e.g., formed at block 502), and extending all the way around the sleeve or shaft, whichever the case may be. As discussed, the circumferential groove operates by affecting the damping or damping capability of the corresponding FDB.

At block 506, a pressure-generating groove pattern is formed adjacent to the circumferential groove. For example, pressure-generating groove pattern 403a-1 (FIG. 4B), such as a herringbone groove pattern, is machined or otherwise formed on the FDB sleeve or on the FDB shaft, adjacent to the circumferential groove 403a-2 (e.g., formed at block 504). As discussed, a pressure-generating groove pattern functions to pump the oil or other fluid to a certain localized region of the groove pattern (e.g., to the apex of a herringbone groove pattern), thereby generating a pressure peak at this localized region, which in turn increases the load capacity of the corresponding FDB.

According to an embodiment, the depth of the pumping groove pattern formed at block 502 (e.g., pumping groove depth 404 of FIG. 4C) is greater than the depth of the pressure-generating groove pattern formed at block 506 (e.g., pressure-generating groove depth 408 of FIG. 4C), and the depth of the circumferential groove formed at block 504 (e.g., circumferential groove depth 406 of FIG. 4C) is greater than the depth of the pumping groove pattern (pumping groove depth 404).

While the method described in reference to FIG. 5 describes certain steps in a particular order, embodiments are not necessarily limited to any particular order of carrying out such steps. Thus, the forming of the pumping groove pattern, the circumferential groove, and the pressure-generating groove pattern may be performed in any order required by or suitable to a particular manufacturing process. For a non-limiting example, the pumping groove and pressure-generating groove patterns may be formed in a single process followed up by forming the deeper circumferential groove therebetween.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A fluid dynamic bearing comprising:
    a sleeve;
    a shaft disposed within said sleeve;
    a radial gap between said sleeve and said shaft; and
    a groove configuration positioned in said radial gap, said groove configuration comprising:
        a pressure-generating groove pattern resembling a herringbone groove pattern,
        a circumferential groove adjacent said pressure-generating groove pattern, and
        a pumping groove pattern adjacent said circumferential groove and resembling an extension of said pressure-generating herringbone groove pattern;
        wherein the depth of said circumferential groove is greater than the depth of said pumping groove pattern, and wherein the depth of said pumping groove pattern is greater than the depth of said pressure-generating groove pattern.

2. The fluid dynamic bearing of claim 1, wherein said groove configuration is a journal bearing groove configuration, and wherein said pumping groove pattern is positioned at or near an entry region of said journal bearing groove configuration.

3. The fluid dynamic bearing of claim 1, wherein said circumferential groove extends for 360 degrees.

4. The fluid dynamic bearing of claim 1, wherein said sleeve comprises said groove configuration.

5. The fluid dynamic bearing of claim 4, wherein said sleeve is a rotor.

6. The fluid dynamic bearing of claim 4, wherein said sleeve is a stator.

7. The fluid dynamic bearing of claim 1, wherein said shaft comprises said groove configuration.

8. The fluid dynamic bearing of claim 7, wherein said shaft is a rotor.

9. The fluid dynamic bearing of claim 7, wherein said shaft is a stator.

10. The fluid dynamic bearing of claim 1, wherein said circumferential groove is configured to reduce the damping of said fluid dynamic bearing.

11. The fluid dynamic bearing of claim 1, wherein said pumping groove pattern is configured to maintain the flow of fluid, within said fluid dynamic bearing, in a particular direction and above a particular minimum pressure.

12. A hard disk drive comprising:
    a spindle motor comprising:
        a spindle on which a disk medium is rotatably mounted, and
        a fluid dynamic bearing comprising:
            a sleeve,
            a shaft disposed within said sleeve,
            a radial gap between said sleeve and said shaft, said radial gap bounded by an inner surface of said sleeve and an outer surface of said shaft, and
            a groove configuration positioned in said radial gap, said groove configuration comprising:
                a pressure-generating groove pattern resembling a herringbone groove pattern,
                a circumferential groove adjacent said pressure-generating groove pattern, and
                a pumping groove pattern adjacent said circumferential groove and resembling an extension of said pressure-generating herringbone groove pattern,
                wherein the depth of said circumferential groove is greater than the depth of said pumping groove pattern, and wherein the depth of said pumping groove pattern is greater than the depth of said pressure-generating groove pattern;
    a head slider comprising a read/write head configured to read from and to write to said disk medium; and
    a voice coil actuator configured to move said head slider to access portions of said disk medium.

13. The hard disk drive of claim 12, further comprising:
    a fluid within said radial gap for applying a bearing force to said shaft.

14. The hard disk drive of claim 12, wherein said groove configuration is a journal bearing groove configuration, and wherein said pumping groove pattern is positioned at or near an entry region of said journal bearing groove configuration.

15. The hard disk drive of claim 12, wherein said circumferential groove extends for 360 degrees.

16. The hard disk drive of claim 12, wherein said inner surface of said sleeve comprises said groove configuration.

17. The hard disk drive of claim 12, wherein said outer surface of said shaft comprises said groove configuration.

18. A method for damping a fluid dynamic journal bearing, the method comprising:
    on a shaft or a sleeve of said journal bearing, at a radial interface between said shaft and said sleeve,
        forming a pressure-generating groove pattern resembling a herringbone groove pattern;
        forming a circumferential groove adjacent said pressure-generating groove pattern and extending for 360 degrees; and
        forming a pumping groove pattern positioned at or near an entry region of said journal bearing and resembling an extension of said pressure-generating herringbone groove pattern;
    wherein the depth of said pumping groove pattern is greater than the depth of said pressure-generating groove pattern, and wherein the depth of said circumferential groove is greater than the depth of said pumping groove pattern.

* * * * *